United States Patent
Zhao

(10) Patent No.: US 9,552,212 B2
(45) Date of Patent: Jan. 24, 2017

(54) CACHING INTERMEDIATE DATA FOR SCROLL VIEW RENDERING

(75) Inventor: Keping Zhao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 934 days.

(21) Appl. No.: 13/102,054

(22) Filed: May 6, 2011

(65) Prior Publication Data

US 2012/0284664 A1     Nov. 8, 2012

(51) Int. Cl.
    G06F 3/048    (2013.01)
    G06F 9/44     (2006.01)
    G06F 3/0485   (2013.01)

(52) U.S. Cl.
    CPC ........... *G06F 9/4443* (2013.01); *G06F 3/0485* (2013.01)

(58) Field of Classification Search
    CPC . G06F 17/30902; G06F 9/4443; G06F 3/0485
    USPC ........................................................ 715/784
    See application file for complete search history.

(56) References Cited

U.S. PATENT DOCUMENTS

| | | | |
|---|---|---|---|
| 6,314,452 B1 * | 11/2001 | Dekel et al. | ................ 709/203 |
| 7,681,141 B2 | 3/2010 | Tu | |
| 7,705,851 B2 | 4/2010 | Beda et al. | |
| 7,733,962 B2 | 6/2010 | Weiss et al. | |
| 2005/0071777 A1 * | 3/2005 | Roessler et al. | ............. 715/810 |
| 2009/0315902 A1 | 12/2009 | Beda et al. | |
| 2010/0214313 A1 | 8/2010 | Herman et al. | |

OTHER PUBLICATIONS

"Graphics Performance Improvements", Retrieved at <<http://java.sun.com/products/java-media/2D/perf_graphics.html>>, Retrieved Date: Mar. 17, 2011, pp. 7.
"How to Speed up this Table View Row?", Retrieved at <<http://stackoverflow.com/questions/4712694/how-to-speed-up-this-table-view-row>>,Retrieved Date: Mar. 17, 2011, pp. 2.
Diggins, et al., "Parsing Windows Media Services Log Files", Retrieved at<<http://msdn.microsoft.com/en-us/library/bb383537.aspx>>, Mar. 2007, pp. 14.

* cited by examiner

*Primary Examiner* — Andrey Belousov
(74) *Attorney, Agent, or Firm* — Dan Choi; Micky Minhas

(57) ABSTRACT

Data to be rendered for a scrolling display is processed into an intermediate format. The intermediate format includes data that maps directly to the rendered, displayed format with little computation, yet is smaller in size than the rendered data. This intermediate format is cached, and is rendered on demand during scrolling. During idle times of the display, original data, likely to be accessed in response to scrolling the display, can be prefetched and transformed to the intermediate format.

20 Claims, 5 Drawing Sheets

CACHING INTERMEDIATE DATA FOR SCROLL VIEW RENDERING

BACKGROUND

In most computer systems, data displayed to a user often cannot fit completely within a display area. It is common to display a part of the data, and to provide some mechanism in a user interface to allow the display to be scrolled. In response to actions from the user indicating that the display should be scrolled, other parts of the data are displayed.

Frequently, a representation of data in a display differs from a representation of the data as it is stored in a file, database or memory. In other words, data in its original representation is rendered to create the display.

When creating a scrolling display of data, a tradeoff arises as to when the data is rendered into its displayed representation. In particular, rendering of data into a displayed representation involves both computation costs and storage costs. On the one hand, rendering could occur only when the data is to be displayed. However, the time involved in computing the rendered data could cause a delay in the display of the rendered data, and a poor user experience. In addition, caching of rendered data after it is displayed, to avoid re-computation, would consume substantial memory. On the other hand, rendering all data for a scrolling display would eliminate delays due to computation, but instead would consume a substantial amount of memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Data to be rendered for a scrolling display is processed into an intermediate format. The intermediate format includes data that maps directly to the rendered, displayed format with little computation, yet is smaller in size than the rendered data. This intermediate format is cached, and is rendered on demand during scrolling. During idle times of the display, original data, likely to be accessed in response to scrolling the display, can be prefetched and transformed to the intermediate format.

Accordingly, in one aspect, a portion of original data is transformed into an intermediate format in which data has a direct mapping to a display format. The data in the intermediate format is rendered into the display format and displayed. When a user indicates that another portion of the original data is to be viewed, that portion of the original data is transformed into the intermediate format. That data in the intermediate format is rendered into the display format and displayed. Data in the intermediate format is cached. As a user controls a view of the data to request display of different portions of the original data, if a requested portion of the original data already has its intermediate format in the cache, then the intermediate format data is requested from the cache and rendered into its display format and displayed. The display format data can be discarded when it is no longer being used. Original data can be prefetched and converted into intermediate format data during idle times of the display based on a prediction of likely portions of the original data that may be requested next by the user.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
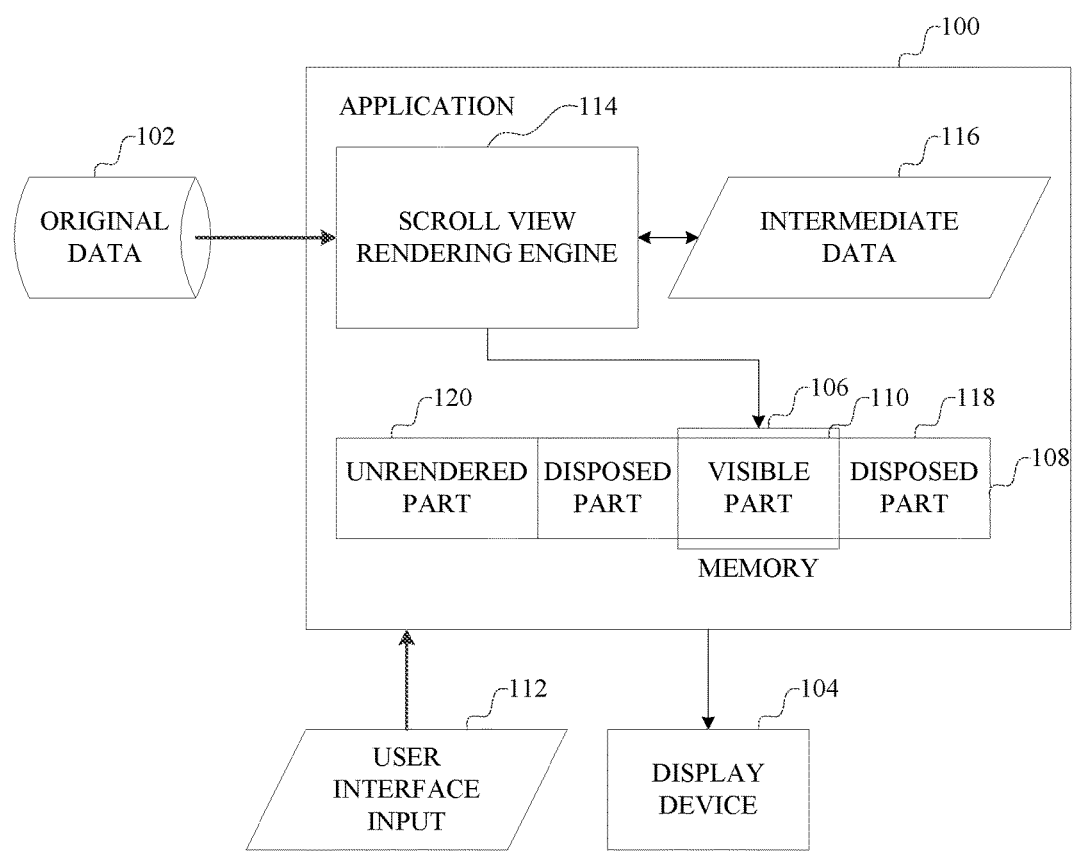
FIG. 1 is a block diagram of an example application that can use an intermediate format in scroll view rendering.

The following section provides an example operating environment in which such scrolling can be implemented. Referring to FIG. 1, an application 100 receives original data 102 which is to be displayed on a display device 104. For example, the display device might be the display of a mobile handheld computing device such as a mobile phone or personal digital assistant, and the application may be an application running on that device.

The entirety of the original data cannot fit completely within a display area on the display device 104. Thus, only a part of the data is displayed, and this data is stored in memory 106. The entirety of the original data is represented schematically at 108, of which the part which is displayed is notated as the "visible part" 110 in memory 106.

An input 112 from a user interface indicates that a user expressed intent to scroll the display. For example, on a mobile phone with a touch screen, the user interface input 112 might represent that the user made a gesture on a touch screen indicating that the displayed data should be scrolled. In response to actions from the user indicating that the display should be scrolled, other parts of the data are displayed.

In general the original data format for which this kind of scroll view rendering is particularly useful is one in which a substantial amount of processing is performed in order generate the rendered display format. For example, data in a markup language may need to be parsed and tokenized. Other data might involve a database lookup in a database in which data is dynamic. Other operations such as matching or searching may be involved. In such circumstances, the original data does not map directly to the rendered display format.

The intermediate format, however, provides the data which map directly to the rendered display format. Such data maps directly to the rendered display format if the operations used to generate the rendered display format from the intermediate data process only the intermediate data into graphics data. Thus, the specifics of the intermediate format depend on the application, and an example of such an application is provided in more detail below.

Thus, the application includes a scroll view rendering engine 114 that transforms selected portions of the original data into data 116 in an intermediate data format. The data in the intermediate format for the visible part 110 is rendered into the display format and stored in the memory 106. When the data is no longer displayed, it display format may be disposed of from the memory, as denoted by the "disposed part" 118. Parts of the data that have yet to be rendered are indicated schematically at 120.

Given this context, an example implementation of the scroll view rendering engine will be described in more detail in connection with FIGS. 2 and 3.

Figure 2:
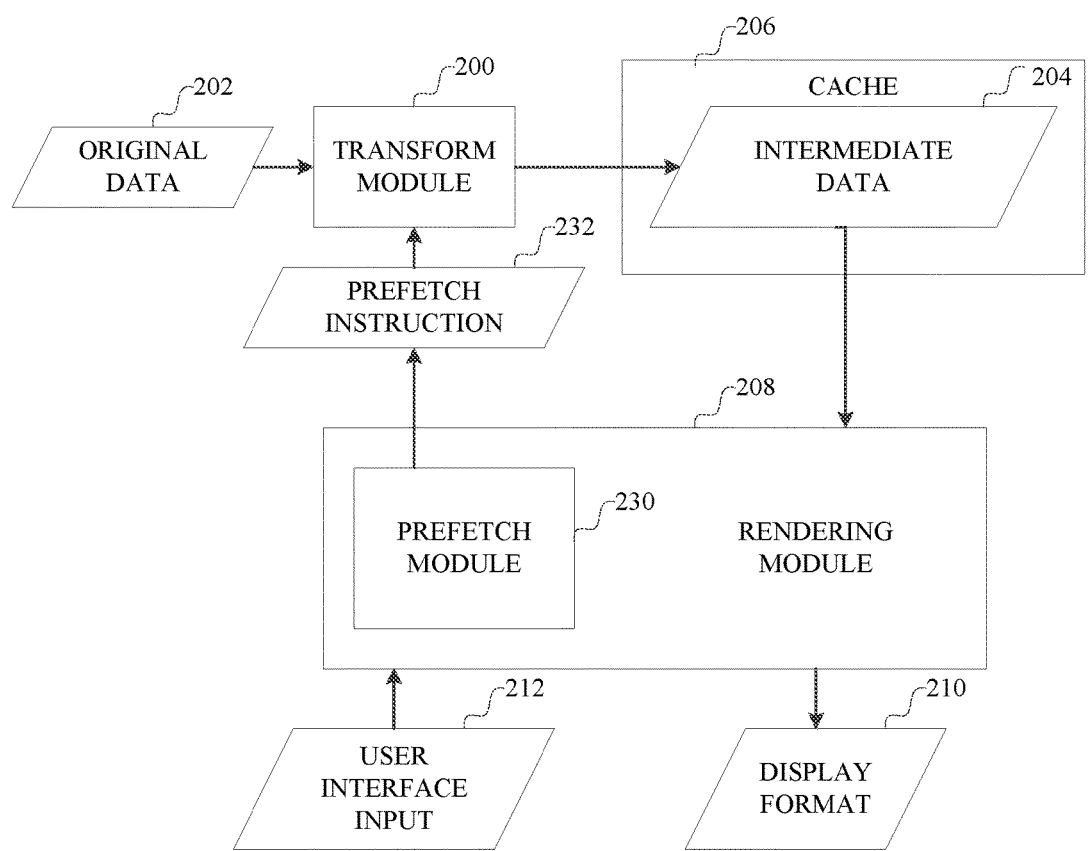
FIG. 2 is data flow diagram illustrating an example implementation of using an intermediate format in scroll view rendering.

In FIG. 2, a transform module 200 has an input for receiving data 202 in an original format and an output providing the data 204 in an intermediate format, for storage in memory, particularly a cache 206. The intermediate data, as noted above, is data that has a direct mapping to a display format. A rendering module 208 has an input for receiving the data 204 in the intermediate format and an output providing the data 210 rendered into the display format, which can be provided to a display.

An input 212 from a user interface to the rendering module 208 can indicate that the display should be scrolled, in response to which the rendering module accesses the corresponding intermediate data from the cache 206. If the intermediate data is not in the cache, then the transform module 200 is instructed to access the original data and generate the intermediate data 204 in the cache 206.

The rendering module also can instruct the transform module to prefetch original data. As an example implementation, the rendering module may include a prefetch module 230 having an output instruction 232 to instruct the transform module to transform a portion of the original data during idle times of the display based on a prediction of likely portions of the original data to be requested.

For example, one method for such prediction involves prefetching the data in the 'order' in which the rendered data was fetched. That is, the rendering module renders a list of data items that are indexed from 1 to N (where N the index of the last item) and are accordingly rendered in the scroll view from the top to the bottom one by one. For example, if the rendered data items were fetched in ascending order according to their index, then the transform module prefetches the next data items following the last rendered one in ascending order. Such a prediction makes sense since the ascending order of the indices indicates that the user is instructing the scroll view to scroll down.

Figure 3:
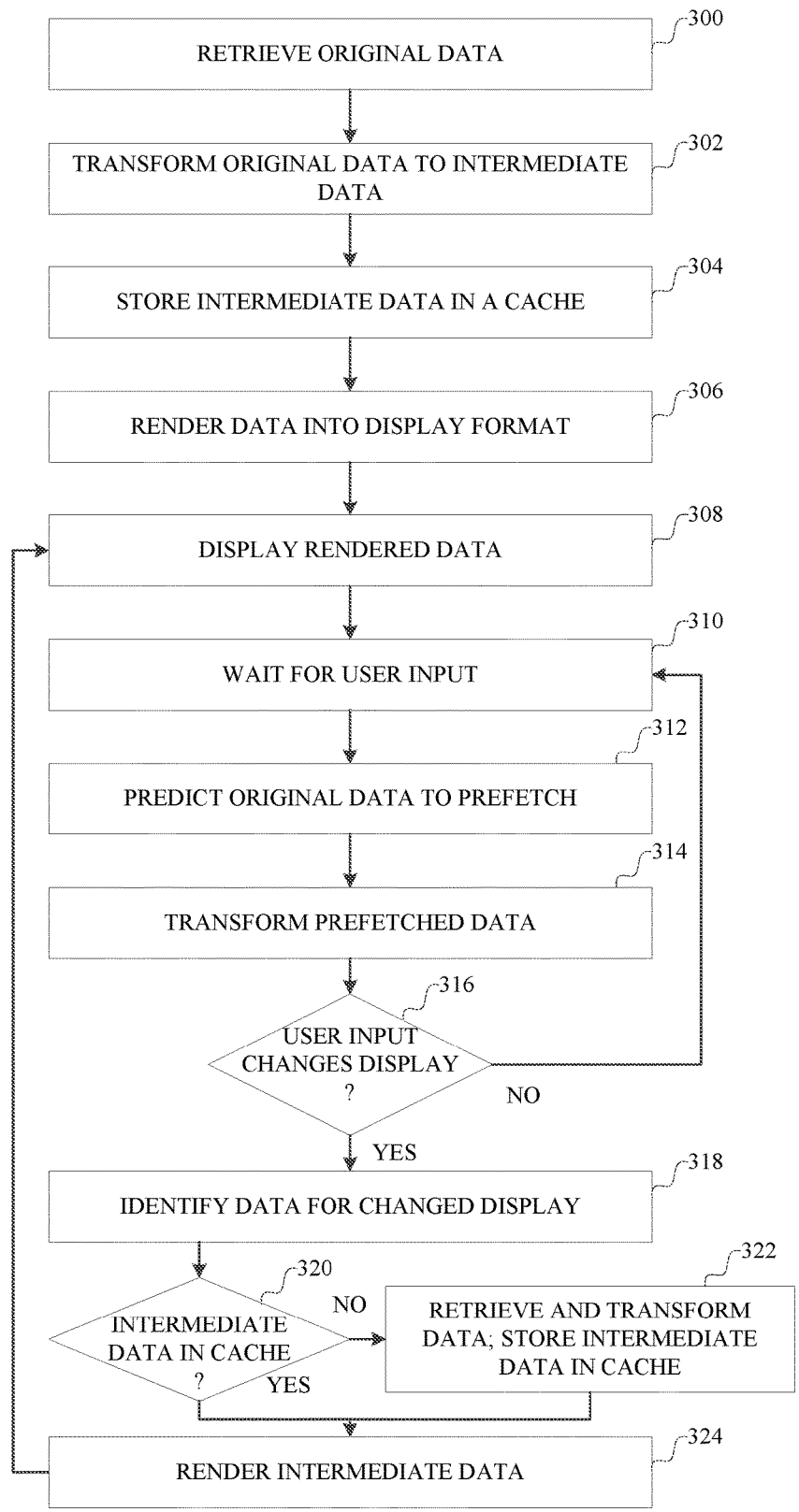
FIG. 3 is a flow chart describing an example operation of the system in FIG. 1.

Referring now to FIG. 3, a flowchart describing an operation of the system of FIG. 2 will now be described.

The original data is retrieved 300. The original data is transformed 302 into the intermediate data, for example by a transform module such as shown in FIG. 2. The intermediate data is stored 304 in a cache. The intermediate data for a portion of the original data to be displayed is then rendered 306 into the display format. An interactive process, involving the user interface and the display, is initiated in which the rendered data is displayed 308 on the display, and the system waits 310 for user input. While waiting for user input, the system can predict 312 which original data to prefetch and transform 314 the prefetched data. Upon receipt of user input that changes the display, as determined at 316, the data to be used for the changed display is identified 318; otherwise the system continues to wait for other user input as shown at 310. If the intermediate data is in the cache, as determined at 320, it is rendered 324. Otherwise, the original data is retrieved and transformed 322, and stored in the cache, and then rendered 324 for display (as shown at 308). The system returns back to waiting 310 for user input.

Figure 4:
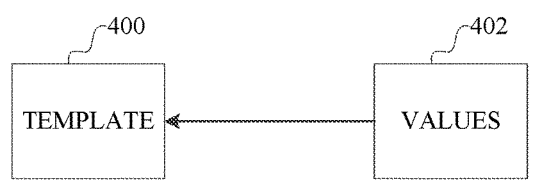
FIG. 4 is an example data structure of original data.
Figure 5:
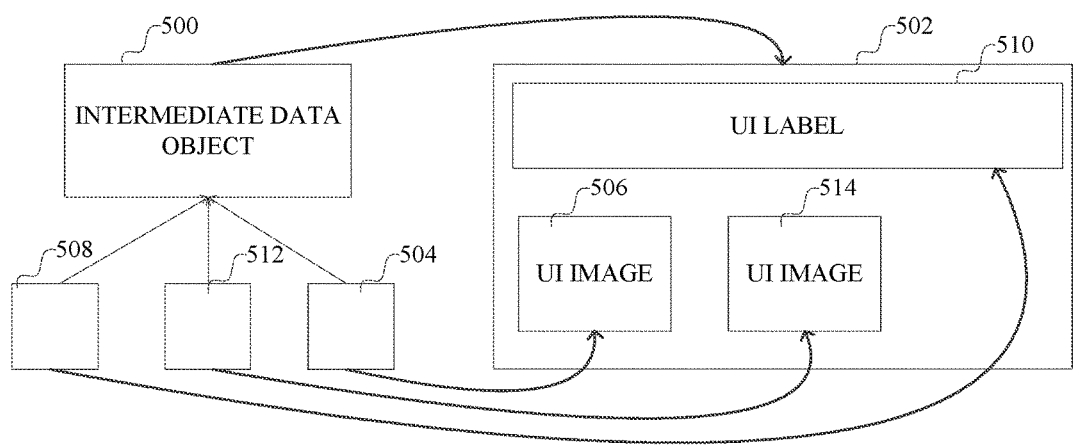
FIG. 5 is an example data structure of intermediate data.
Figure 6:
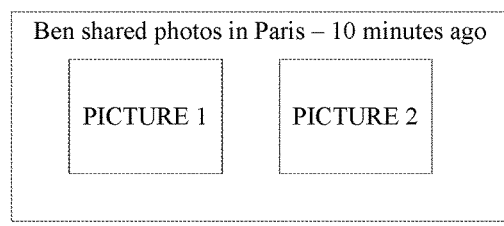
FIG. 6 is an example data structure of a rendered view.

Having now described the general operation of such scroll view rendering, a specific example will now be described. Referring now to FIGS. 4 through 6, example data formats for an example application that would make use of such scroll view rendering, using intermediate formats, will now be described.

As a specific example, consider a display such as a "What's New" feed for an individual, typical in most social networking and portal applications. Such a feed is a description of the recent activities, such as recent activities of friends on different web sites. For example, an item might indicate that a friend posted some pictures on their account, the time (or how long ago) the pictures were posted and some information about the pictures.

The original data for such a feed includes, for each item, two parts as shown in FIG. 4. A first part 400 (a template) describes how to render and layout one specific item. The second part 402 (a value) contains information about the unique information of one specific item. The template part is in some markup language very similar to HTML. The difference is that the template includes a significant amount of data as placeholders. When the template is processed, the placeholders are replaced by the real data extracted from the value part. The value part is represented in XML and contains the specific data for an item.

An example of XML data for a template for a "what's new" feed is found in Appendix A. An example of XML data for values for such a template is found in Appendix B. For example, Appendix B provides an example in which the labels ("Ben" and "Paris") are found, and variables that, when parsed, allow a parser to identify an album of photos, determine the number of photos, when the album was posted, so as to complete the phrase "Ben shared photos in Paris—10 minutes ago," and obtain thumbnails for two photos.

A transform module (e.g., 200 in FIG. 2) transforms the original data into the intermediate data, providing an intermediate data object as shown in FIG. 5. The intermediate data map directly to a rendered object for display. In particular, each intermediate data object describes the contents rendered in a rectangle area. This information includes the size (width and height) and position of rectangle, the background color, and other display factors. An intermediate object, e.g., 500, references a rectangle area, e.g., 502. Each intermediate data object can contain a list of other intermediate data objects, e.g., 504, which fall into the rectangle 502, as shown at 506.

An intermediate data object also can include other information specific to some common type of rendering results, such as a user interface label or an image. The intermediate data object 508, for a label 510, for example, contains extra information including the text string in the label (e.g., Ben shared photos in Paris—10 minutes ago), the font name, the font size and the font color. The intermediate data object 512 for an image 514, for example, contains extra information including a source for the image, e.g., a uniform resource identifier (URI). This object could indicate whether the image output can be variable size or whether it is fixed size to which the source image is resized.

Different object classes could be provided for such intermediate data objects for labels and images and the like, which may be implemented as subclasses of a generic intermediate data object. Another example of an intermediate data object is for rich text, which can include the number of lines of text, an origin in the rectangle with which the text should be aligned, the string of text, the width of each line, etc. Another example of an intermediate data object is for an image list, which is similar to an image, but includes an array of sources for the image data, and the graphical size of the rectangle in which they will be rendered. While FIG. 5 shows an instance of objects representing a specific item, an object class hierarchy that can be used depends on the application.

To process the original data for an item into the intermediate data, there are several steps.

First, the template part is parsed, including mark-up parsing and de-serialization, text tokenizing and indexing. This parsing is more complex than simply parsing markup language elements due to the placeholder information. View layout information, e.g., position and float direction, is obtained. The placeholders also are parsed.

Next, the value part is parsed, including XML parsing and de-serialization, and values for placeholders are collected. The placeholders in the template are matched with those found in the value part, and the template is filled.

The filled template is stored in the intermediate format. To transform the original data into intermediate data, instead of rendering the actual view the intermediate data is created.

To render the intermediate data into the final output is straightforward because they represent simply text data, images, and a graphic box into which they are placed. The intermediate data objects hierarchy is traversed, and the objects encountered are directly rendered. Such a display corresponding to this example is shown in FIG. 6.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
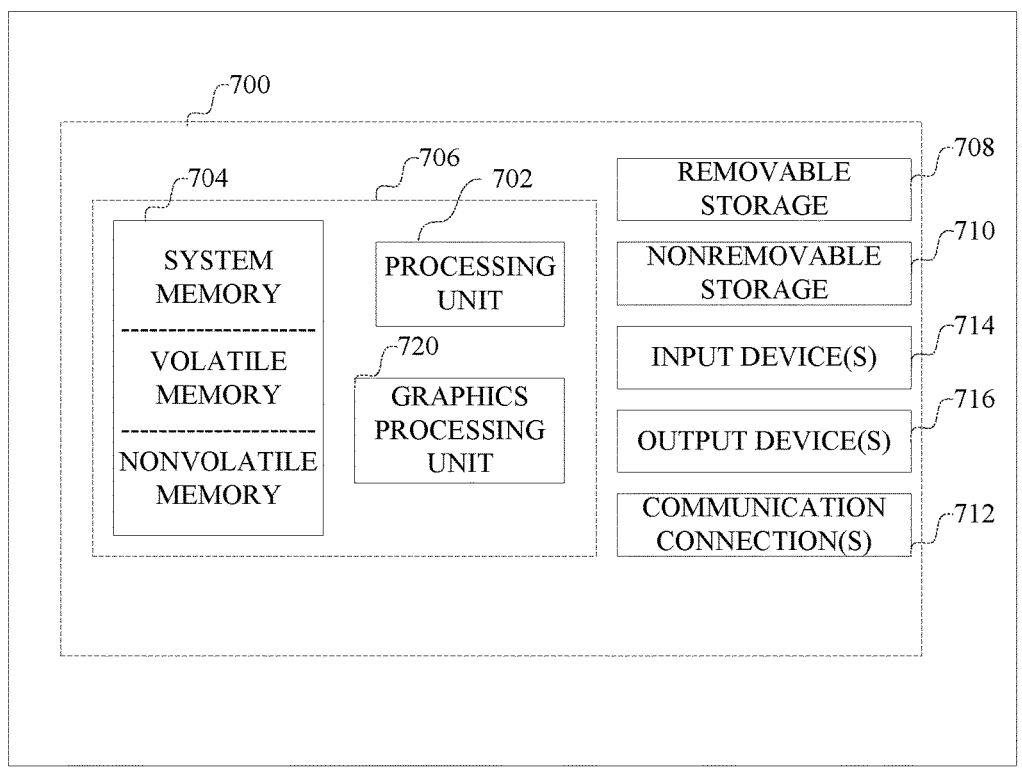
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device (s) 714 such as a display, a keyboard, mouse, pen, camera, touch input device, and so on. Output device(s) 716 such as speakers, a printer, and so on may also be included. All of these devices are well known in the art and need not be discussed at length here.

The system for scroll view rendering may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

APPENDIX A

<RecentActivityTemplateContainer>
    <ApplicationId>1234</ApplicationId>
    <ApplicationName>Photos</ApplicationName>
    <MiniIconSizeX>0</MiniIconSizeX>

APPENDIX A-continued

```xml
<MiniIconSizeY>0</MiniIconSizeY>
<ChangeType>60</ChangeType>
<Locale>en-us</Locale>
<RequestedLocales>
    <string>en-us</string>
</RequestedLocales>
<TemplateRevision>1312</TemplateRevision>
<Templates>
    <RecentActivityTemplate>
        <Cardinality>One</Cardinality>
        <Data>{list:Thumbs({image:Photo}) style=
        "OpenViewer"}</Data>
        <Title>{publisher-id:publisher} shared photos in
{hlink:AlbumTitle}</Title>
        <LayoutDetails>
            <TemplateTypeDetails>
                <TemplateType>AppGrid</TemplateType>
                <LayoutProperties>
                    <LayoutProperty>
                        <Name>Type</Name>
                        <Value>Photo</Value>
                    </LayoutProperty>
                    <LayoutProperty>
                        <Name>PrimaryImage</Name>
                        <Value>{list:Thumbs({image:Photo})}</Value>
                    </LayoutProperty>
                    <LayoutProperty>
                        <Name>Publisher</Name>
                        <Value>{publisher-id:publisher}</Value>
                    </LayoutProperty>
                    <LayoutProperty>
                        <Name>Action</Name>
                        <Value>shared photos in {hlink:AlbumTitle}
                        </Value>
                    </LayoutProperty>
                    <LayoutProperty>
                        <Name>Footer</Name>
                        <Value>via {hlink:AppName="Photos"}</Value>
                    </LayoutProperty>
                    <LayoutProperty>
                        <Name>ConsumeURL</Name>
                        <Value>{hlink:AlbumTitle}</Value>
                    </LayoutProperty>
                </LayoutProperties>
            </TemplateTypeDetails>
        </LayoutDetails>
    </RecentActivityTemplate>
</Templates>
<ActivityType>
    <string>photo</string>
    <string>media</string>
</ActivityType>
<CanMergeItemsWithSameObjectID>false
</CanMergeItemsWithSameObjectID>
<RequiresNotification>true</RequiresNotification>
</RecentActivityTemplateContainer>
```

APPENDIX B

```xml
<ActivityDetails>
    <OwnerCID>3456</OwnerCID>
    <ObjectId>678!429</ObjectId>
    <ApplicationId>1234</ApplicationId>
    <ChangeType>60</ChangeType>
    <PublishDate>2011-03-02T22:25:09Z</PublishDate>
    <TemplateVariables>
        <TemplateVariable xsi:type="PublisherIdTemplateVariable">
            <Name>publisher</Name>
            <Id>3456</Id>
            <NameHint>Ben</NameHint>
            <LastNameHint>Zhao</LastNameHint>
            <IsFavorite>true</IsFavorite>
        </TemplateVariable>
        <TemplateVariable xsi:type="HlinkTemplateVariable">
            <Notations>
                <Notation>
                    <Name>RecentActivity.AuthPolicy</Name>
```

APPENDIX B-continued

```xml
                    <Value>MBI</Value>
                </Notation>
                <Notation>
                    <Name>RecentActivity.CnsId</Name>
                    <Value>678!291</Value>
                </Notation>
                <Notation>
                    <Name>RecentActivity.EnvironmentSupportUrl</Name>
                    <Value>http://cid-
678.photos/redir.aspx?page=browse&type=5&client=
wnf&view=thumbs&ct=photos&resId=678!291</Value>
                </Notation>
            </Notations>
            <Name>AlbumTitle</Name>
            <Value>http://cid-
678.photos/redir.aspx?page=browse&type=5&client=
wnf&view=thumbs&ct=photos&resId=
678!291&authKey=</Value>
            <Text>Paris</Text>
            <ValueAsSafeLink>http://cid-
678.photos/redir.aspx?page=browse&type=5&client=
wnf&view=thumbs&ct=photos&resId=
678!291&authKey=</ValueAsSafeLink>
        </TemplateVariable>
        <TemplateVariable xsi:type="ImageTemplateVariable">
            <Notations>
                <Notation>
                    <Name>RecentActivity.AuthPolicy</Name>
                    <Value>MBI</Value>
                </Notation>
                <Notation>
                    <Name>RecentActivity.CnsId</Name>
                    <Value>678!429</Value>
                </Notation>
                <Notation>
                    <Name>RecentActivity.EnvironmentSupportUrl</Name>
                    <Value>http://cid-
678.photos/redir.aspx?type=1&client=wnf&ct=
photos&resId=678!429</Value>
                </Notation>
                <Notation>
                    <Name>RecentActivity.ImageHash</Name>
                    <Value>i8Cb1wl7D+QtaHShNS/xRVHDUC4=</Value>
                </Notation>
                <Notation>
                    <Name>RecentActivity.ImageHeight</Name>
                    <Value>70</Value>
                </Notation>
                <Notation>
                    <Name>RecentActivity.ImageSize</Name>
                    <Value>2805</Value>
                </Notation>
                <Notation>
                    <Name>RecentActivity.ImageWidth</Name>
                    <Value>96</Value>
                </Notation>
                <Notation>
                    <Name>RecentActivity.IsSelfPageUrl</Name>
                    <Value>true</Value>
                </Notation>
                <Notation>
                    <Name>RecentActivity.MagazineTopStoryImageHash</Name>
                    <Value>sANmgWhnGcvxU5HV4o9nIkCH9ao=</Value>
                </Notation>
                <Notation>
<Name>RecentActivity.MagazineTopStoryImageHeight
</Name>
                    <Value>448</Value>
                </Notation>
                <Notation>
<Name>RecentActivity.MagazineTopStoryImageSize
</Name>
                    <Value>35047</Value>
                </Notation>
                <Notation>
<Name>RecentActivity.MagazineTopStoryImageUrl
</Name>
<Value>http://public.blu.photos/
y1mj6r4EewrBjI7hHDjVJRf6EtfoqZDaPwL wZqJHP4H6ZSDmDTli8EB-
20WPMHqkKdiv4acwGbf6Hdk__sOTJEjvvy7ekzAAn3bU</Value>
```

APPENDIX B-continued

```
            </Notation>
            <Notation>
      <Name>RecentActivity.MagazineTopStoryImageWidth</Name>
                <Value>600</Value>
            </Notation>
            <Notation>
         <Name>RecentActivity.MagazineThumbnailHeight
         </Name>
                <Value>238</Value>
            </Notation>
            <Notation>
      <Name>RecentActivity.MagazineThumbnailImageHash
      </Name>
                <Value>aSj2l3UHkytY3pKi9UoKO3SC5aQ=</Value>
            </Notation>
            <Notation>
      <Name>RecentActivity.MagazineThumbnailImageSize</Name>
                <Value>12848</Value>
            </Notation>
            <Notation>
      <Name>RecentActivity.MagazineThumbnailImageUrl</Name>
   <Value>http://public.blu.photos/
y1mj6r4EewrBjI7hHDjVJRf6EtfoqZDaPwL
4EBnrfN8jpOaPYx40RgKvf7dYBJbSb-r_TK7PbHmmY3V2uSiP-
ztZTFURxcTjnL6</Value>
            </Notation>
            <Notation>
         <Name>RecentActivity.MagazineThumbnailWidth
         </Name>
                <Value>320</Value>
            </Notation>
         </Notations>
         <Name>Photo</Name>
   <Value>http://public.blu.photos/
y1mj6r4EewrBjI7hHDjVJRf6EtfoqZDaPwL
3q6vT880m3IzjQKaAYNuXB6BpCof5yIm1aQ3uhJyBZgGP1R00nmjj
</Value>
            <AltText>110302_142441.jpg</AltText>
            <Href>http://cid-
678.photos/redir.aspx?type=1&client=wnf&ct=
photos&resId=678!429 &authKey=</Href>
            <HrefAsSafeLink>http://cid-
678.photos/redir.aspx?type=1&client=wnf&ct=
photos&resId=678!429 &authKey=</HrefAsSafeLink>
         </TemplateVariable>
         <TemplateVariable xsi:type="HlinkTemplateVariable">
            <Notations>
               <Notation>
                  <Name>RecentActivity.AuthPolicy</Name>
                  <Value>MBI</Value>
               </Notation>
               <Notation>
      <Name>RecentActivity.EnvironmentSupportUrl</Name>
                  <Value>http://cid-678.photos/</Value>
               </Notation>
            </Notations>
            <Name>AppName</Name>
            <Value>http://cid-678.photos/</Value>
            <ValueAsSafeLink>http://cid-678.photos/
            </ValueAsSafeLink>
         </TemplateVariable>
      </TemplateVariables>
      <ActivityID>00010000-7bbe-a95b-6406-9c43a569a96d</ActivityID>
      <RelevanceInfo>
         <TimeWeightedScore>0.9002207</TimeWeightedScore>
      </RelevanceInfo>
      <CanPublishComments>true</CanPublishComments>
      <VisibilityHint>6</VisibilityHint>
</ActivityDetails>
```

What is claimed is:

1. A computer-implemented process comprising:
   receiving original data into memory of a device wherein the original data when rendered do not fit within a display of the device and do not map directly to a rendered display format for the display;
   a processor of the device transforming an initial portion of the received original data in the memory into an intermediate format stored in a cache in memory of the device, the data in the intermediate format having a direct mapping to a display format, the initial portion of the received original data including at least a first part of the original data which, when rendered, fits within the display of the device, and a second part of the original data which, when rendered, does not fit within the display of the device;
   the processor of the device accessing the transformed original data in the intermediate format corresponding to the first part of the initial portion of the received original data, and rendering the accessed transformed original data of the first part into the display format;
   displaying the rendered first part of the initial portion of the transformed original data on the display of the device;
   receiving an input indicative of an action of a user selecting another portion of the received original data; and
   in response to the input indicative of the action from the user selecting another portion of the received original data, the processor of the device processing the input by:
     determining, based on the selected other portion of the received data, if transformed data corresponding to the selected other portion of the received original data is in the cache,
     in response to determining the transformed data is in the cache, accessing the transformed original data in the intermediate format corresponding to the selected other portion of the received original data from the cache,
     in response to determining the transformed data is not in the cache, transforming the selected other portion of the received original data into the intermediate format and storing the transformed data in the cache, and
     rendering the transformed original data in the intermedia format for the selected other portion of the original data into the display format and displaying the rendered intermediate format data for the selected other portion of the original data on the display of the device; and
   repeating the steps of receiving an input and processing the input in an interactive process.

2. The computer-implemented process of claim 1 wherein the interactive process includes receiving inputs as a user controls a view of the data to request display of different portions of the original data.

3. The computer-implemented process of claim 1, further comprising prefetching the original data and transforming the prefetched original data into data in the intermediate format stored in the cache during idle times of the display based on a prediction of likely portions of the original data to be requested.

4. An article of manufacture comprising:
   a computer storage medium;
   computer program instructions stored on the computer storage medium which, when processed by a processor of a device with a display, instruct the processor to perform a process comprising:
   receiving original data into memory of the device wherein the original data when rendered do not fit within the display of the device and do not map directly to a rendered display format for the display;
   the processor of the device transforming an initial portion of the received original data in the memory into an intermediate format stored in a cache in memory of the device, the data in the intermediate format having a direct mapping to a display format, the initial portion of the received original data including at least a first part of the original data which, when rendered, fits within the display of the device, and a second part of the original data which, when rendered, does not fit within the display of the device;

the processor of the device accessing the transformed original data in the intermediate format corresponding to the first part of the initial portion of the received original data, and rendering the accessed transformed original data of the first part into the display format;

displaying the rendered first part of the initial portion of the transformed original data on the display of the device;

receiving an input indicative of an action of a user selecting another portion of the received original data; and in response to the input indicative of the action from the user selecting another portion of the received original data, the processor of the device processing the input by:

determining, based on the selected other portion of the received data, if transformed data corresponding to the selected other portion of the received original data is in the cache, in response to determining the transformed data is in the cache, accessing the transformed original data in the intermediate format corresponding to the selected other portion of the received original data from the cache, in response to determining the transformed data is not in the cache, transforming the selected other portion of the received original data into the intermediate format and storing the transformed data in the cache, and rendering the transformed original data in the intermedia format for the selected other portion of the original data into the display format and displaying the rendered intermediate format data for the selected other portion of the original data on the display of the device; and repeating the steps of receiving an input and processing the input in an interactive process.

5. The article of manufacture of claim 4, wherein the interactive process includes receiving inputs as a user controls a view of the data to request display of different portions of the original data.

6. The article of manufacture of claim 4, wherein the process further comprises prefetching the original data and transforming the prefetched original data into data in the intermediate format in the cache during idle times of the display based on a prediction of likely portions of the original data to be requested.

7. A computing machine comprising:

a processor, a memory connected to the processor, and a display;

a cache in the memory of the computing machine;

a transform module executed by the processor and having an input for receiving data from the memory of the computing machine in an original format, wherein the data in the original format, when rendered, do not fit within the display of the computing machine and do not map directly to a rendered display format for the display, and an output providing at least an initial portion of the original data in an intermediate format for storage in the cache in the memory of the computing machine in which the data in the intermediate format have a direct mapping to a display format, the initial portion of the received original data including at least a first part of the original data which, when rendered, fits within the display of the device, and a second part of the original data which, when rendered, does not fit within the display of the device;

a rendering module executed on the processor and having an input to receive data in the intermediate format from the cache and an output providing data rendered from the data in the intermediate format into the display format;

the display having an input to receive the rendered data and a display area to display the rendered data; and wherein the rendering module receives, in an interactive process, user interface inputs, an input indicating an action from the user selecting another portion of the received original data, the rendering module being operative in response to the action to:

determine, based on the selected other portion of the received data, if transformed data corresponding to the selected other portion of the received original data is in the cache, in response to determining the transformed data is in the cache, access the data in the intermediate format corresponding to the selected other portion of the original data from the cache, in response to determining the transformed data is not in the cache, direct the transform module to transform the selected other portion of the received original data into the intermediate format and store the transformed data in the cache, and render, and output to the display, the data in the intermediate format for the selected other portion of the received original data.

8. The computing machine of claim 7, further comprising a prefetch module having an output instructing the transform module to transform a portion of the original data into intermediate format data stored in the cache during idle times of the display based on a prediction of likely portions of the original data to be requested.

9. The computer-implemented process of claim 1, wherein the action from the user selecting another portion of the received original data comprises a scrolling operation related to the display.

10. The computer-implemented process of claim 1, wherein the original data comprises a first part comprising a template describing how to render and layout an item of data and a second part comprising a value containing information about the item of data.

11. The computer-implemented process of claim 1, wherein the intermediate format comprises an intermediate data object referencing an area and content rendered in the area.

12. The computer-implemented process of claim 3, wherein the prediction is based on an order of presentation of items in the original data.

13. The article of manufacture of claim 4, wherein the action from the user selecting another portion of the received original data comprises a scrolling operation related to the display.

14. The article of manufacture of claim 4, wherein the original data comprises a first part comprising a template describing how to render and layout an item of data and a second part comprising a value containing information about the item of data.

15. The article of manufacture of claim 4, wherein the intermediate format comprises an intermediate data object referencing an area and content rendered in the area.

16. The article of manufacture of claim 6, wherein the prediction is based on an order of presentation of items in the original data.

17. The computing machine of claim 7, wherein the action from the user selecting another portion of the received original data comprises a scrolling operation related to the display.

18. The computing machine of claim 7, wherein the original data comprises a first part comprising a template describing how to render and layout an item of data and a second part comprising a value containing information about the item of data.

19. The computing machine of claim 7, wherein the intermediate format comprises an intermediate data object referencing an area and content rendered in the area.

20. The computing machine of claim 8, wherein the prediction is based on an order of presentation of items in the original data.

\* \* \* \* \*